Nov. 8, 1960 J. A. MONTGOMERY 2,959,290
SETTLING TANK WITH AGITATING VANES
Filed Jan. 17, 1958 4 Sheets-Sheet 1
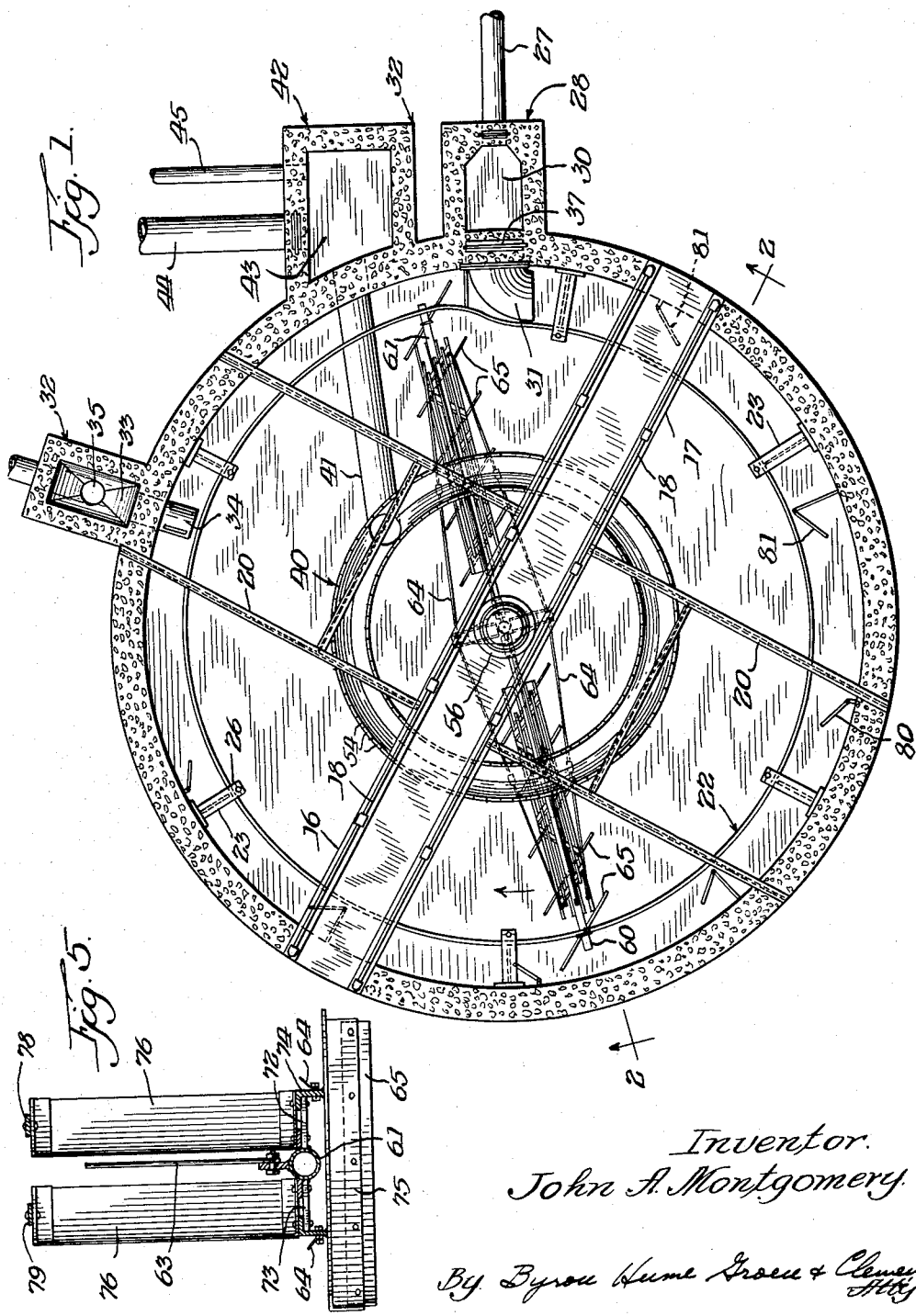
Inventor.
John A. Montgomery.
By Byron Hume Groen & Clement
Attys.

Nov. 8, 1960  J. A. MONTGOMERY  2,959,290
SETTLING TANK WITH AGITATING VANES
Filed Jan. 17, 1958  4 Sheets-Sheet 2
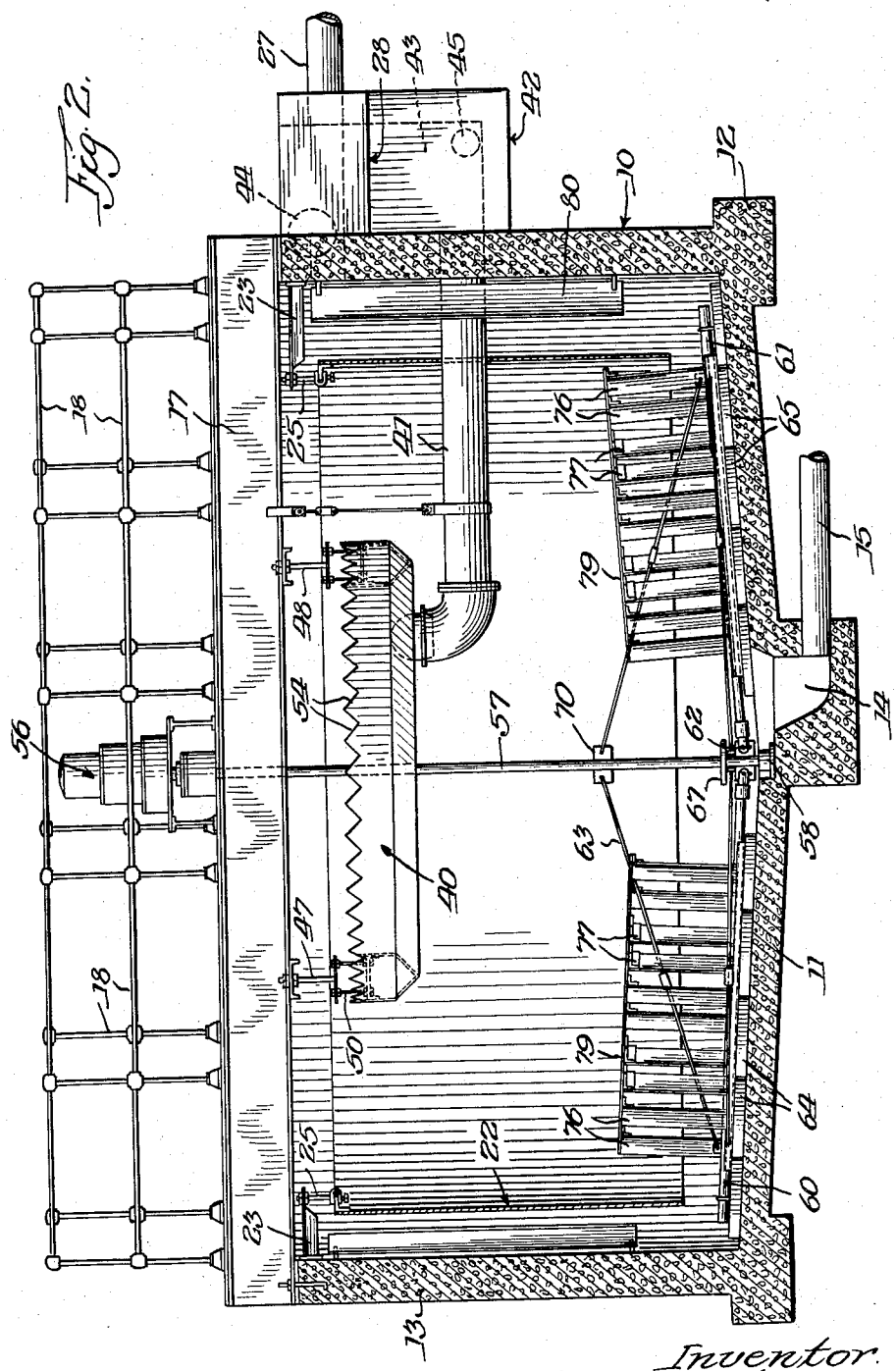
Inventor.
John A. Montgomery.
By Byron Hume Groen & Clement
Attys.

Nov. 8, 1960   J. A. MONTGOMERY   2,959,290
SETTLING TANK WITH AGITATING VANES
Filed Jan. 17, 1958   4 Sheets-Sheet 3
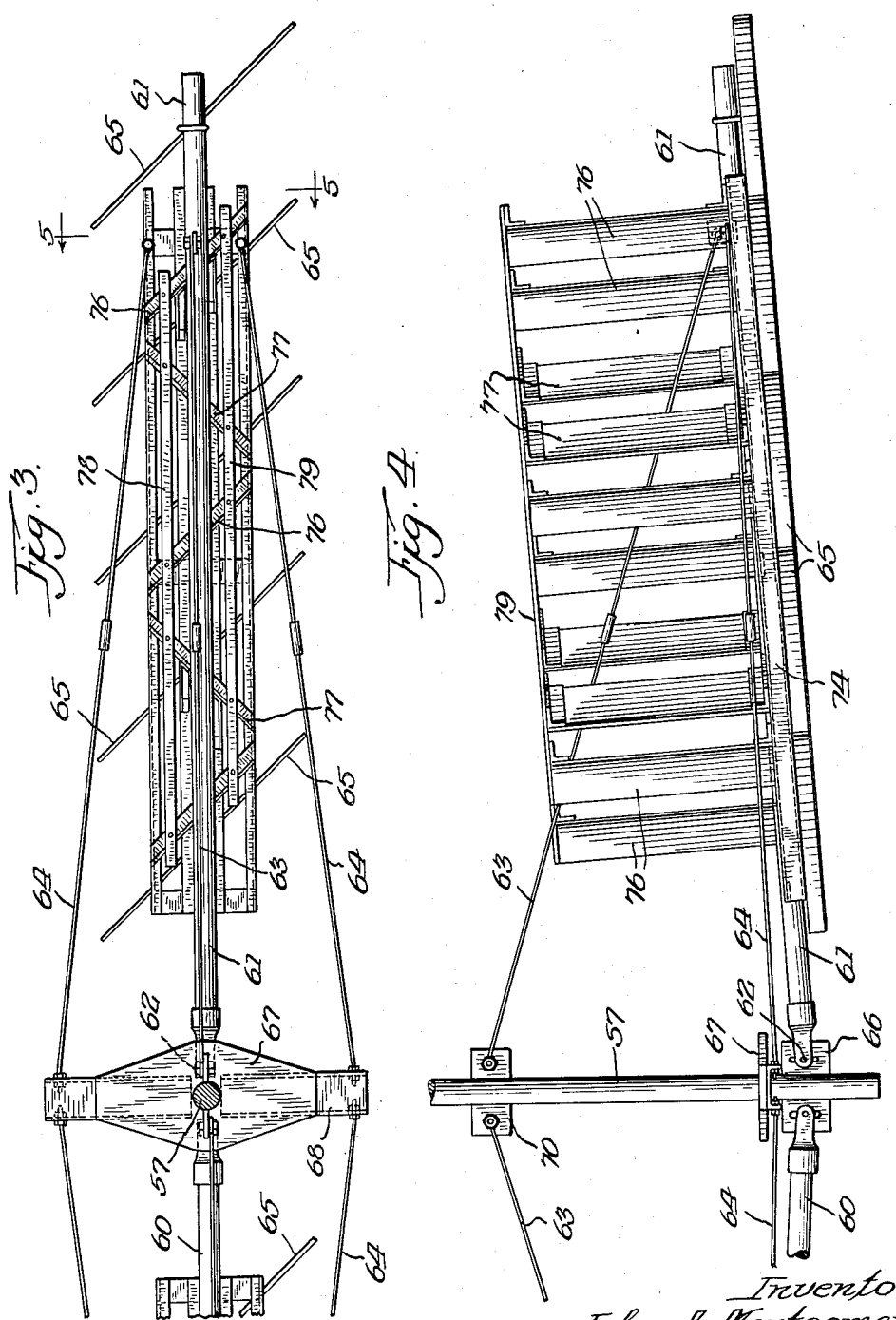
Inventor:
John A. Montgomery.
By Byron Hume Groen & Clement
Attys

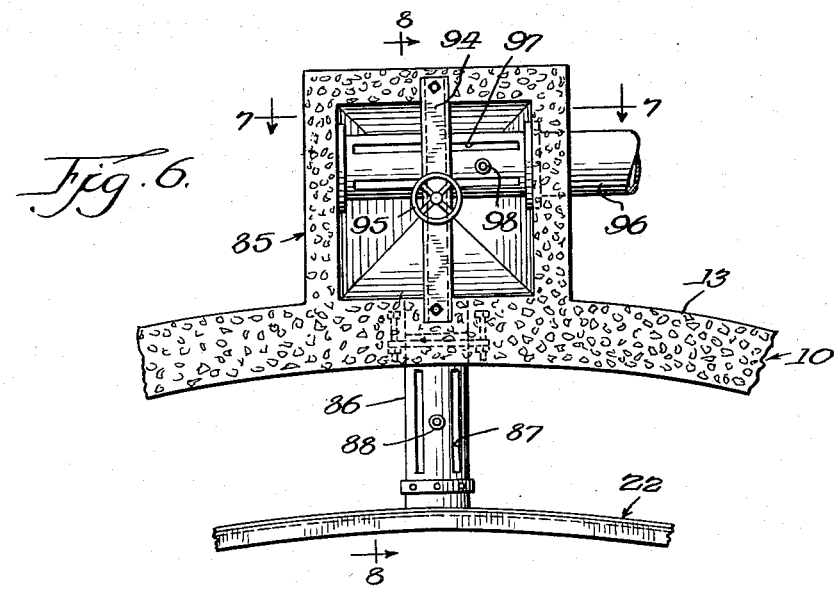
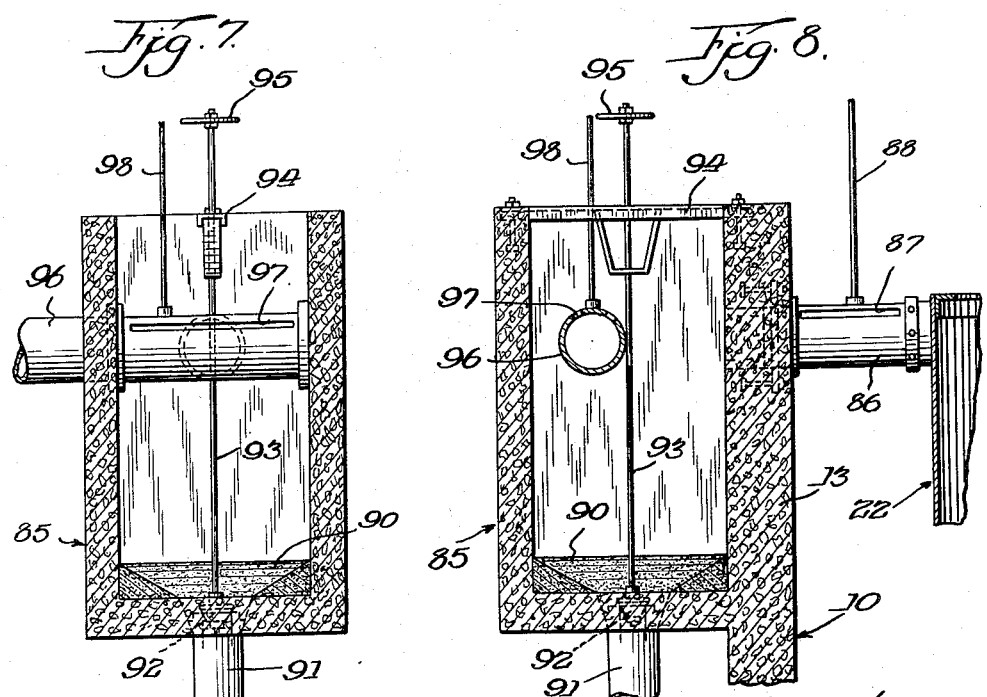

United States Patent Office 2,959,290
Patented Nov. 8, 1960

2,959,290

SETTLING TANK WITH AGITATING VANES

John A. Montgomery, Chicago, Ill., assignor to Lakeside Engineering Corporation, Chicago, Ill., a corporation of Illinois Filed Jan. 17, 1958, Ser. No. 709,591

3 Claims. (Cl. 210—528)

The invention relates generally to settling tanks for clarifying liquids such as slurries, sewage and industrial wastes and has reference more particularly to novel apparatus designed for action on the liquids as they flow through the tanks to thereby improve the operating efficiency of the tanks in clarifying said liquids.

The sedimentation and clarification tank shown in the drawings of my prior Patent No. 2,418,950 is characterized by a circular skirt which depends downwardly and in spaced relation with respect to the circular wall of the tank to form within the tank an annular down-flow settling chamber and a contiguous, centrally located up-flow clarifying chamber. The incoming liquid is discharged tangentially within the annular settling chamber to promote the flow of the liquid around this annular race. Within the clarifying chamber there is located a launder for decanting the clear liquid and below the launder and in contact with the base of the tank the conventional scraper arms are provided for progressively moving the sludge to a central discharge outlet.

The improved apparatus of the invention is most conveniently incorporated in tanks of the character and design as thus described, and therefore a primary object resides in the provision of means adapted to be carried by and to rotate with the scraper arm mechanism for improving the clarifying efficiency of the tank by increasing the agglomerating and flocculating action on the solid particles to thus accelerate their settling on the bottom of the tank as sludge.

In connection with the foregoing, a more specific object of the invention is to equip the rotating scraper arm mechanism of said clarifying tanks with upstanding agitating vanes so that said apparatus will therefore be capable of performing a dual function in the processing of the liquid flowing through the tank. The agitating vanes promote the flocculation of the solids and thus facilitate their settling out as sludge, whereas, the scrapers perform the usual function of progressively moving the sludge to the sludge outlet.

Another object is to provide a sedimentation and clarification tank as described which will have one or more baffles depending for approximately the full length of the annular settling chamber for retarding and baffling the peripheral flow within the chamber to a minor extent only such as will promote and facilitate settling of the heavy solids from the liquid.

Scum outlets and scum boxes have heretofore been provided in clarifying tanks such as described for removing the scum from the surface of the liquid in the peripheral race. However, sometimes liquids contain excessive amounts of oil, such as mineral oil, and in such event, it is desired that the oil be removed from the scum to prevent the oil from reaching the digester, since it is very detrimental to sludge digestion. For solving this problem the invention provides a separate scum pipe in the scum box so as to decant the oil from the top of the scum, the oil thus collected thereupon being diverted from the system.

With these and other objects in view, the invention may consist of certain novel features of construction and operation as will be more fully described and particularly pointed out in the specification, drawings and claims appended thereto.

In the drawings, which illustrate an embodiment of the invention, and wherein like reference characters are used to designate like parts—

Figure 1 is a top plan view of a clarifying tank having a depending skirt to form settling and clarifying chambers and which incorporates the novel and improved apparatus of the invention;

Figure 2 is a vertical sectional view of the clarifying tank taken substantially along line 2—2 of Figure 1;

Figure 3 is a fragmentary plan view showing the novel scraper arm mechanism of the invention;

Figure 4 is a fragmentary side elevational view of the scraper arm mechanism of Figure 3 and which best illustrates the addition of the agitating vanes to said mechanism;

Figure 5 is a transverse sectional view of the scraper arm mechanism taken substantially along line 5—5 of Figure 3;

Figure 6 is a fragmentary top plan view of a scum outlet box illustrating modified structure for separately removing the scum and mineral oil from the surface of the liquid in the annular race;

Figure 7 is a vertical sectional view taken substantially along line 7—7 of Figure 6; and Figure 8 is a vertical sectional view taken substantially along line 8—8 of Figure 6.

Referring to the drawings, and in particular Figures 1 and 2, the numeral 10 indicates a tank or settling basin which may be circular or other desired shape and formed of concrete, wood, steel or the like, and having a conical bottom 11 and base supporting portions 12. The circular walls 13 of the tank extend upwardly from the base portions 12 and said walls support the superstructure and other equipment for the present tank. The conical bottom 11 of the tank is provided with a sludge pocket 14 centrally located in the base 11 and which connects with the sludge drawoff pipe 15. The superstructure supported by the tank includes the diametrically extending beams 16 and 17 and which provide a walk across the top of the tank, the same additionally including guard rails 18, having location on and extending upwardly from each of the beams. The superstructure additionally includes the strengthening and reinforcing members 20 which likewise extend diametrically of the tank and at right angles to the beams 16 and 17 and connect therewith in a suitable manner for strengthening the beams and for imparting the desired rigidity to the said structure.

The interior of the present settling tank is divided into two compartments by means of a depending skirt identified in its entirety by numeral 22. The radially extending supports 23 are suitably secured to the wall 13 and the depending skirt is in turn secured to said supports 23 by means of the rods 25. The depending skirt is positioned within the tank in spaced relation with the wall 13 thereof to provide an annular chamber. It will also be observed that the depending skirt terminates short of the bottom wall 11 so that the tank is divided into two compartments, one comprising the annular chamber which receives the incoming liquid and the other comprising the contiguous clarifying chamber from which the clear liquid is decanted.

The raw liquid for processing such as water, industrial wastes, sewage or the like, is delivered to the tank by means of the supply pipe 27 having connection with the inlet box 28, preferably constructed of concrete and formed integral with the wall 13 of the tank. From the well 30 of the inlet box the liquid is conducted to the annular race by means of the influent deflector 31 which is located at about the liquid level and which functions to discharge the liquid tangentially so as to cause flow of the same around said annular chamber and downwardly within said chamber in order to pass under the depending skirt and into the contiguous, centrally located clarifying chamber. Any material in the incoming liquid that is too light to settle remains on the surface of the liquid within the annular chamber and is eventually swept around to drawoff points by means of this rotary movement of the liquid. The material is commonly referred to as scum and the same may also include any grease or oil that may float on the surface of the liquid. For removing the scum, one or more scum outlet boxes 32 are provided, the same being preferably formed integral with the wall 13 of the tank on the exterior surface thereof so as to project radially outward from the wall. Each box is provided with a well 33 and the slotted scum pipe 34 controls the flow of the scum to the said outlet box from which the scum is conducted by means of discharge pipes 35. The gate 37 controls flow of the incoming liquid to the settling tank.

Within the clarifying chamber the liquid travels upwardly to the launder 40. From the launder the clear liquid is withdrawn and discharged from the tank by the effluent pipe 41 connecting therewith. It will be observed that the pipe passes through the depending skirt 22, into and through the annular chamber, and through wall 13 of the tank to connect with the clarified liquid outlet box 42. Said box is also preferably formed of concrete, being built integral with the tank, and the same is provided with the well 43. The effluent discharge pipe 44 is connected to the box 42 as is also the recirculating pipe 45. It will be observed that the effluent pipe 41 is below the level of the liquid in the annular chamber and also that said pipe is preferably located near the end of the annular race, considering the direction of movement of the liquid therein. These constructional features help to minimize the turbulence caused by pipe 41 and its interference with the flow of liquid around the race.

The launder 40 is supported from the beams 16 and 17 by the hangers 47 and 48 in a manner to permit limited adjustment vertically of the launder within the clarifying chamber. By adjustment of the threaded rods 50 it is possible to vary the position of the launder 40 vertically of the clarifying chamber and to position the same horizontally so that the clear liquid is withdrawn in the most satisfactory manner.

Both side walls of the launder may be notched along the top edge to provide weirs 54 over which the liquid flows into the launder. The weirs are therefore V-shaped and the same are designed so that the total length of the serrated edge, including the inside and outside wall of the launder, is equal to at least one-half of the total length of the bottom edge of the depending skirt 22.

The beams 16 and 17 provide the support for the motor and speed reducing mechanism, indicated in its entirety by numeral 56, and which is supported by said structure centrally of the tank. The drive shaft 57 depends downwardly from the motor mechanism and terminates adjacent the bottom 11 of the tank, the terminal end of shaft 57 being journalled and positioned by the bearing member 58. Two oppositely extending inclined scraper arms 60 and 61 are suitably supported at 62 adjacent the terminal end of the shaft 57 and additional supporting means for the scraper arms consists of the tie-rods 63 and 64. Each of the scraper arms 60 and 62 consists of a metal pipe or similar structural element and it will be seen that the same is suitably secured at its inner end to the shaft 57 and suitably braced by the tie-rods, which position the scraper arms at a slight angle to the horizontal, whereby they are substantially parallel to the conical bottom wall 11 of the tank. A plurality of flat sheet metal plows or scrapers 65 are secured to each of the scraper arms 60 and 61 and the said scrapers are set at an angle with respect to the direction of rotation of the scraper arms so as to scrape the sludge from the bottom 11 of the tank and propel the same to the sludge pocket 14.

Referring more particularly to Figures 3, 4 and 5, it will be seen that the scraper arms 60 and 61 each have connection at 62 with plates 66 welded to the shaft 57 and extending diametrically therefrom. An additional plate 67 projects laterally from shaft 57 and channels 68 are welded to said plate to which the tie rods 64 are secured. The tie rods 63 connect with the shaft by means of the plates 70. The supporting structure for the scrapers 65 is best shown in Figure 5 and includes the plates 72 and 73 extending from opposite sides of each scraper arm and to which the angle members 74 are secured. The said members 74 are in turn welded to a transversely disposed structural member such as an angle beam 75 and a scraper or plow 65 is suitably secured to said beam.

The improved apparatus of the invention is carried by the scraper arms and the same rotates therewith. Using the plates 72 and 73 and the angle members 74 as supporting means, a plurality of agitating vanes 76 and 77 are provided, the same having an upstanding position on the scraper arms so as to extend into the clarifying chamber of the tank. The vanes may be in alignment or staggered and parallel to the scraper arms although the vanes 76 are disposed at an angle transversely of the arms which is approximately parallel to the scrapers 65. However, the vanes 77 are so disposed transversely of the arms that they form an angle with the scrapers. Accordingly, the arrangement of the vanes may be termed zigzag for the length of each scraper arm and with adequate space between adjacent vanes to permit flow of liquid between the same. The vanes 76 and 77 are connected and strengthened along their top ends by the metal strips 78 extending along one side of the scraper arm and on the opposite side the metal strips 79 connect and strengthen the top edges of the said vanes.

When the present settling tank is operating as a primary clarifier for raw sewage, for example, the liquid from the supply pipe 27 will enter the annular chamber by means of the effluent deflector 31. Accordingly, the liquid is discharged into the annular chamber in a tangential dierction so as to cause movement around the chamber and to also facilitate spiralling movement of the liquid in a downward direction toward the bottom of the tank. Upon reaching the bottom of the depending skirt the liquid will flow under the same and into the settling chamber and thus, whereas the flow of the liquid in the annular chamber is in a downward direction, the flow of the liquid within the clarifying chamber is in an upward direction. The maximum separation of the solid particles from the liquid is effected in the annular chamber since flow is in a downward direction and the heavy particles naturally settle out. To facilitate this settling and clarifying action the invention provides a number of baffles, such as 80 and 81, said baffle 80 extending from the circular wall 13 to within the annular chamber for a part of its width, whereas baffles 81 can be described as extending from the circular skirt 22 to within the annular chamber also for a portion of its width. The baffles have a length almost equal to that of the depending skirt and said baffles are stationary, although they may have a pivotal connection with their support so that their angularity can be adjusted to vary the effect which they may have in retarding and baffling the flow of the liquid as it circulates around and downwardly within the annular chamber. The action of the baffles is to promote and assist in flocculation and the settling out of the large and heavy particles during said flow.

The liquid upon flowing under the depending skirt 22 enters the clarifying chamber and additional flocculation takes place within this chamber since the flow is in an upward direction and at a relatively slow rate. The flocculation is the result of the counterflow between the liquid and the solids. The liquid flows upwardly, whereas the suspended particles eventually settle out by flowing downwardly to be deposited on the bottom of the tank as sludge. A heavy concentration of solids will accordingly exist in the vicinity of the bottom edge of the depending skirt and above the scraper arms. This bed of solids forms a sludge bed which acts as a filter for the liquid entering the clarifying zone. The liquid must flow through the sludge bed and in so doing the fine particles tend to agglomerate and flocculate so that the heavier particles thus formed settle out by gravity.

The agitating vanes 76 and 77 are provided for the purpose of promoting an assisting the flocculating action of the suspended particles. The said vanes extend upwardly from the rotating scraper arms so that they rotate therewith and gently agitate the liquid. The scraper arms rotate at a very slow rate on the order of three or four revolutions per hour. Also it will be observed that the vanes extend some distance within the clarifying chamber although the height of the vanes is of course not too critical. The vanes should not extend too far within the clarifying chamber since they would then have location above the sludge bed of the suspended particles and accordingly the top extending ends would fail to accomplish their intended purpose of promoting flocculation. The liquid upon flowing through the clarifying chamber has all of the heavy particles removed therefrom and a high percentage of the very fine solids are also removed as a result of the intensive clarification to which the liquid is subjected. Upon reaching the launder 40 the clear liquid flows over the weirs 54 and the same is discharged from the tank through the effluent pipe 41.

In the modification shown in Figures 6, 7 and 8 the scum outlet box is indicated by numeral 85 and said box is formed integral with the cylindrical wall 13 of the tank so as to project outwardly from the exterior surface of the cylindrical wall, being spaced at a desired location circumferentially of the tank. For removing the scum from the surface of the liquid in the annular chamber the outlet box is provided with a connecting pipe 86, the same being located in the annular chamber at liquid level and extending from the circular skirt 22 to the cylindrical wall 13 and through the wall into the outlet box 85. The pipe 86 may be provided with longitudinal slots such as 87 for decanting the scum and other material such as may float on the surface of the liquid in the annular chamber. The numeral 88 indicates a handle which extends upwardly from pipe 86 to provide for rotative adjustment of the scum outlet pipe.

The scum outlet box 85 is preferably provided with a conical bottom such as 90 and the said bottom wall of the outlet box is formed with a central discharge outlet leading to the scum discharge pipe 91. Opening and closing of the entrance to the discharge pipe 91 is effected by the valve member 92 fixed to the lower end of the valve rod 93, which extends vertically of the outlet box through the cross-piece 94 and above said cross-piece for convenient manipulation by the operator and which is facilitated by the handle 95 fixed to the said upwardly extending end of the valve rod. By actuation of valve rod 93 the valve member 92 is correspondingly actuated so that the scum discharge opening 91 may be completely closed, partially opened, or completely opened, depending on whether it is desired to trap some of the scum and liquid from the tank within the outlet box.

When the liquids undergoing clarification in the tank contain oil such as mineral oil, the same is removed from the annular chamber through the scum outlet pipes 86. However, should mineral oil, for example, occur in excessive amounts, it is desirable to remove the same from the scum in order to prevent the oil from reaching the digester, since it is very detrimental to sludge digestion. For solving this problem the invention provides a separate scum pipe 96 extending across the outlet box from one side wall to the opposite side wall and passing through one of the side walls so that the oil thus removed from the scum can be separately diverted from the system. The scum pipe 96 is similarly provided with elongated slots 97 through which the mineral oil and other liquids and solids may freely flow into the said pipe. Also the said pipe is provided wth a handle for effecting rotative adjustment of the said pipe.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. In a settling device, in combination, a circular tank having a vertical cylindrical wall and a slightly conical shaped bottom wall, a circular skirt depending within the tank in spaced eccentric relation with the cylindrical wall, said skirt terminating short of the bottom whereby the skirt divides the tank into an annular chamber around the skirt and into a centrally disposed clarifying chamber within the skirt, an inlet conduit for supplying incoming liquid to the annular chamber, a launder positioned within the clarifying chamber for decanting the clear liquid, a vertical drive shaft depending centrally of the clarifying chamber, diametrically disposed scraper arms fixed to the drive shaft for rotating with said shaft as an axis, scrapers carried by said arms for removing settled sludge from the bottom wall of the tank and conveying it to a sludge discharge outlet, and a plurality of baffles in the annular chamber extending vertically for approximately the depth of the depending skirt.

2. In a settling device of the character as defined by claim 1, additionally including agitating vanes disposed transversely of the scraper arms and having rotation with the said scraper arms, said agitating vanes having an upstanding position on the scraper arms and said vanes extending upward within the bottom portion of the clarifying chamber.

3. In a settling device of the character as defined by claim 1, additionally including agitating vanes carried by and having rotation with the said scraper arms, said agitating vanes having an upstanding position on the scraper arms, said vanes extending to within the bottom portion of the clarifying chamber and said vanes being disposed in rows transversely of the scraper arms with adjacent rows being arranged at intersecting angles.

References Cited in the file of this patent

UNITED STATES PATENTS

| | | |
|---|---|---|
| 1,672,583 | Travers | June 5, 1928 |
| 1,938,894 | Darby et al. | Dec. 12, 1933 |
| 2,051,149 | Nordell | Aug. 18, 1936 |
| 2,418,950 | Montgomery | Apr. 15, 1947 |
| 2,525,842 | Thompson et al. | Oct. 17, 1950 |
| 2,527,788 | Bieker | Oct. 31, 1950 |
| 2,678,916 | Kalinski | May 18, 1954 |
| 2,714,090 | Thompson et al. | July 26, 1958 |